E. O. SESSIONS.
CABLE END BELL.
APPLICATION FILED FEB. 9, 1912.

1,069,820. Patented Aug. 12, 1913.

Witnesses:
Robert F. Brack
Leonard W. Novander

Inventor
Edson O. Sessions
By Browne Williams
Attorneys

UNITED STATES PATENT OFFICE.

EDSON O. SESSIONS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

CABLE-END BELL.

1,069,820.

Specification of Letters Patent.

Patented Aug. 12, 1913.

Application filed February 9, 1912. Serial No. 676,575.

*To all whom it may concern:*

Be it known that I, EDSON O. SESSIONS, a citizen of the United States, residing at Chicago, in the county of Cook and State of Illinois, have invented certain new and useful Improvements in Cable-End Bells, of which the following is a full, clear, concise, and exact description, reference being had to the accompanying drawings, forming a part of this specification.

My invention relates to an improved construction of cable end bell, particularly designed for use in connection with armored cable.

Heretofore it has been difficult to properly take care of the end of the armor used in connection with armored cable when the end is stripped back for connection in a cable end bell, and by my invention the end of the armor wires, bands or strips are securely held in position so as to connect the armor to the shell of the end bell mechanically and electrically and thus prevent accidents from the effect of the ends of the armor upon the sheath of the cable and, at the same time, thoroughly ground the exposed ends of the armor.

Figure 1:
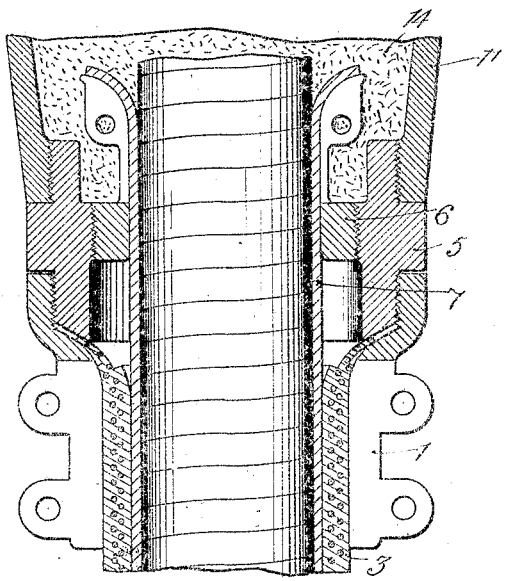
Figure 2:
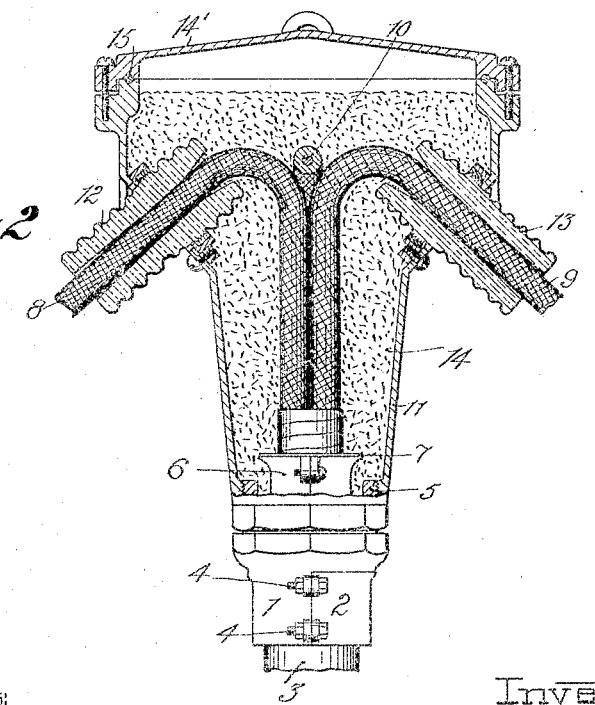

The several drawings illustrating my invention are as follows:

Figure 1 shows the lower portion of a cable end bell in longitudinal section with a cable in place therein. Fig. 2 shows in a view similar to Fig. 1 a complete cable end bell with a connection completed therein.

Similar numerals refer to similar parts throughout the several views.

As shown in Fig. 1, the lowermost portion of the shell of the cable end bell consists of a clamping member 1 which, as shown in Fig. 2, is designed to coöperate with a second clamping member 2 to securely engage the outer surface of an armored cable just below the turned-out ends of the armor wires or strips when they are stripped back from the sheath for the purpose of making a connection. When it is desired to make a connection with an armored cable, the parts 1 and 2 are first clamped in the position indicated in Fig. 2, around the end of the cable 3, by means of bolts 4, and then the armor wires or strips are forced outward against the inner upper surface of the clamping member 1 and are held in this position by a sleeve 5 threaded to engage the internal threads formed in the upper end of the member 1. When the sleeve 5 is screwed down in place, firmly pressing the armor ends of the bands of rectangular or other section against the inside of the clamping member 1, it will be seen that the armor is securely held in engagement mechanically with the clamping member and that a good electrical connection is made between the armor and said member. The lower end of the sleeve 5 is beveled, as indicated, to engage the upper ends of the armor wires or strips and force them outward away from the sheath 7 against the conical surface formed in the upper end of the clamp member 1 to receive them, and thus injury to the sheath resulting from the ends of the armor is prevented. When the sleeve is thus put in place, the sheath clamp member 6 is screwed into the sleeve 5 around the outer end of the sheath 7 of the cable and when the sheath clamping members have been properly put in place, as indicated in Fig. 2, the lead of the sheath is formed outward, as indicated in Fig. 1, to rest against the outwardly flaring surface of the upper end of the sheath clamp. Connection is then made with the conductors of the cable by means of wires 8, 9, and 10, as shown in Fig. 2, and the main shell 11 of the cable end bell is screwed in place upon the upper end of the threaded sleeve 5. After the wires 8, 9 and 10 have been properly supported in the outlet openings of the bell by means of the insulators 12 and 13, the bell is filled with insulating compound 14 which, when it hardens, securely holds the upper end of the sheath 7 in place so as to assist in forming a secure mechanical connection between the cable and the bell. The cover 14' is then secured in place against a gasket 15 carried by the upper end of the bell so as to make a moisture-proof joint.

As a result of the construction described, independent means are provided for clamping the armor and sheath of the cable to the end bell.

While I have shown my invention in the particular construction described above, it will be understood that I do not limit myself to its exact arrangement as I may employ equivalent devices in carrying out my invention without departing from the spirit thereof.

What I claim is:

1. In a cable end bell, the combination of a clamp for engaging the armor of a cable the end of which has been flared out, a clamp for engaging the sheath of the cable, said sheath clamp having one member thereof threaded into one member of the armor clamp, a shell having threaded engagement with one member of the armor clamp and extending upward from the clamps, and insulating compound in the shell.

2. In a cable end bell, the combination of a first clamp for engaging the armor of a cable the end of which is flared out, a second clamp for engaging the sheath of the cable, said second clamp having one member thereof threaded into one member of the armor clamp and a shell extending upward from the clamps having screw threaded connection with one member of the armor clamp.

3. In a cable end bell, the combination of a clamp for engaging the armor of a cable the end of which is flared out, a second clamp for engaging the sheath of the cable and a shell extending from the armor clamp, said shell having threaded engagement with one member of the said armor clamp.

4. In a cable end bell, the combination of a clamp for engaging the armor of a cable the end of which has been flared out, and a second clamp for engaging the sheath of the cable, one member of said sheath clamp being threaded into one member of said armor clamp.

5. In a cable end bell, the combination of a clamp for engaging the armor of a cable, said armor clamp comprising a sleeve for engaging the end of the armor and pressing it outward against the other member of said armor clamp, a second clamp for engaging the sheath of a cable, one member of said sheath clamp having threaded engagement with said sleeve, and a shell having threaded engagement with the sleeve and extending upward from the clamps.

6. In a cable end bell, the combination of a clamp for engaging the armor of a cable, said armor clamp comprising a member for flaring outward the end of the armor against the other member forming a part of said armor clamp, a second clamp for engaging the sheath of the cable, one member of said sheath clamp, and a shell having threaded engagement with said first mentioned member extending upward from the clamps.

In witness whereof, I hereunto subscribe my name this 20th day of January, A. D. 1912.

EDSON O. SESSIONS.

Witnesses:
ALBERT C. BELL,
HENRY L. STOUT.